United States Patent [19]

Krahn et al.

[11] Patent Number: 5,072,648

[45] Date of Patent: Dec. 17, 1991

[54] CONTROL SYSTEM FOR A FLUID OPERATED JACK

[75] Inventors: Darren L. Krahn, Concord; John E. Wible, Painesville, both of Ohio

[73] Assignee: Caterpillar Industrial Inc., Mentor, Ohio

[21] Appl. No.: 532,724

[22] Filed: Jun. 4, 1990

[51] Int. Cl.[5] ........................ F15B 13/02; F16D 31/02

[52] U.S. Cl. ........................................... 91/52; 91/47; 91/454; 91/405; 60/433

[58] Field of Search ................. 91/404, 405, 443, 454, 91/47, 52; 60/433, 469

[56] References Cited

U.S. PATENT DOCUMENTS

| | | | |
|---|---|---|---|
| 3,842,943 | 10/1974 | Nakamura et al. | 91/454 X |
| 4,065,112 | 12/1977 | Leskovec et al. . | |
| 4,102,132 | 7/1978 | Palmer . | |
| 4,121,512 | 10/1978 | Valdespino | 91/454 X |
| 4,318,332 | 3/1982 | Shingu et al. | 91/443 X |
| 4,401,009 | 8/1983 | Zeuner et al. | 91/454 X |
| 4,548,296 | 10/1985 | Hasegawa | 91/452 |
| 4,557,180 | 12/1985 | Glomeau | 91/454 X |
| 4,727,791 | 3/1988 | Satoh | 91/47 |
| 4,741,247 | 5/1988 | Glomeau | 91/361 |
| 4,794,843 | 1/1989 | Poling | 91/443 X |
| 4,854,218 | 8/1989 | Stoll | 91/361 X |

*Primary Examiner*—Edward K. Look
*Assistant Examiner*—John Ryznic
*Attorney, Agent, or Firm*—Alan J. Hickman

[57] ABSTRACT

A control system for a fluid operated jack reduces the speed of retraction of a piston rod of the jack to an acceptable rate during a preselected range of operation by adding pressurized fluid flow to the fluid being exhausted from the jack through a restrictor valve to the reservoir. This reduction in speed reduces the potential for damage to the jack and associated componentry without sacrificing efficiency of operation. An implement controller causes fluid flow from a fluid source to be combined with the flow of fluid being exhausted from the jack in response to receiving a position signal from a implement position sensor and subsequent to the implement controller commanding the shifting of a control valve to a position at which fluid flow is passed from the fluid operated jack to the reservoir. The control system is particularly suitable for use on an automatic guided vehicle.

15 Claims, 3 Drawing Sheets

CONTROL SYSTEM FOR A FLUID OPERATED JACK

DESCRIPTION

1. Technical Field

This invention relates to a control system for a fluid operated jack wherein the speed of retraction of the jack is reduced by adding fluid to the flow of fluid being exhausted from the fluid operated jack through a restriction to a reservoir and more particularly to a control system for a material handling vehicle wherein the speed of lowering of the lift mast is controlled by adding pump flow to the flow of fluid being exhausted from the jack to the reservoir through a flow control valve and a selectively actuatable control valve.

2. Background Art

Systems for controlling the flow of fluid to and from a fluid operated jack, such as used in material handling applications, often include a manually actuatable control valve for modulating the flow of fluid delivered from a pump to the jack so that the speed of extension of the jack may be precisely controlled by the operator associated with the material handling function. The ability to be able to accurately modulate the flow of fluid is particularly important in material handling applications wherein a load engaging implement of a lift mast assembly must be accurately positioned so that a load may be picked up or deposited without being damaged. Manually actuatable control valves of this type are often capable of modulating cylinder to reservoir flow so that the speed and lowering of the load engaging implement may be controlled for accurate positioning. Manual control valves which are capable of relatively accurate fluid flow modulation tend to be very expensive as they require very accurate and intricate machining. Because of this expense such valves are frequently not used.

During lowering of the load engaging implement the vehicle operator regulates the speed of the jack by modulating the fluid flow delivered from the jack to the reservoir. Even with the most sophisticated modulatable control valve available and under the control of an experienced operator the ability to smoothly and gradually stop movement of the jack during lowering of the implement is virtually impossible. Therefore, bouncing of the jack and the the implement occurs which results in inaccurate positioning of the load engaging implement. When a load is carried on the implement bouncing and abrupt stopping can cause load movement relative to the implement which further aggravates the ability to accurately position the load for deposit at a selected location. Over time, bouncing can cause premature failure of the structural components of the lift mast assembly as well as the componentry of the associated fluid operated system and the jack.

In material handling applications it is desirable for the operator to lower the implement until bottoming out of the jack and/or the implement occurs so that the lift mast assembly is at the fully lowered position and the weight of the implement is at rest on the lift mast structure and free from being supported by the lift chains and lift jack associated with the lift mast assembly. Typically the vehicle operator is unable to accurately determine the bottomed out location. As a result the operator will often overshoot the mark during lowering which causes impact between the component parts of the lift mast assembly and/or the jack. This impact generates undesirable noise and damage to the components. Often the speed selected by the operator to lower the load engaging implement is faster than appropriate which makes it difficult to smoothly and gradually reduce the speed of lowering of the implement just prior to bottoming out. As a result, the force of impact and the amount of noise generated is greater than acceptable which is also detrimental to the life of the system and components.

The inability to accurately control the speed of lowering of the jack is even more pronounced when a single acting fluid operated jack is utilized. In a single operated jack fluid flow is typically directed to and from the head end of the jack and the rod end of the jack is vented to atmosphere. During lowering of the implement the jack to reservoir flow is modulated by a control valve connected therebetween. Therefore, the weight of the implement and the load carried thereon, under the force of gravity, is relied upon to force the fluid to pass through the control valve to the reservoir at a desired rate. Due to the dynamics of the vehicle this fluid pressure will fluctuate which makes modulation of fluid flow and the rate of descent of the implement difficult to control.

In driverless automatic guided vehicles of the type having a load engaging implement for elevationally moving a load the need to be able to accurately control the speed and position of the load engaging implement is even more important, and more difficult to achieve. Such vehicles often utilize electrically driven worm gear drives for elevationally moving the load engaging implement. These drives tend to be extremely slow in operation and subject to premature wear which causes a reduction in the accuracy of positioning. Due to the slow speed of operation of the drive the loading cycle time is increased which reduces the efficiency of operation. Using a fluid operated system with a modulatable control valve would improve the speed of operation. However, such a system is not available due to the high cost, complexity and the inability to accurately automatically modulate fluid flow to the reservoir.

Control valves of the electrohydraulic or solenoid actuated type are available for controlling fluid flow. However, such control valves do not modulate fluid flow accurately enough to provide smooth control of the fluid flow, especially during retraction of the jack and lowering of the implement. Such valves have been used on automatic guided vehicles, but not with total success. In order to permit usage of such valves the rate of fluid flow passed by the valves was reduced to a relatively low flow rate so that the abruptness of operation could be minimized. Because of this reduction in the flow rate the speed of elevational movement of the implement tends to be somewhat slower than desired.

Motor driven fluid operated pumps have been provided on electrically powered material handling vehicles for many years. An example of a motor control system is shown in U.S. Pat. No. 4,102,132 dated July 25, 1978 to Normal G. Palmer. The motor driving the pump is actuatable to provide fluid flow on the demand basis and in response to the need for pressurized fluid flow to extend the jack an raise the load. Such systems are effective in saving electrical energy but do not contribute a solution to the problems related to control during retraction of the jack and lowering of the implement.

Hydraulic cushioning devices have been available for years. One such cushioning device is shown in U.S. Pat. No. 4,065,122, dated Dec. 27, 1977, to Edward V. Leskovec et al. The cushioning device includes a plunger which is located in the cylinder housing of the jack and interacts with the piston rod to reduce the speed of retraction of the rod as the rod approaches the end of stroke. This cushioning device forces a trapped volume of fluid to be squeezed through a plurality of orifices which decrease in number until the end of stroke is completed and the rod is bottomed out. Such devices reduce impact and noise but tend to be expensive and limited to a preselected range of operation. It is desirable to have flexibility so that the range of operation and speed of operation of cylinder cushioning may be easily varied.

The present invention is directed to overcoming one or more of the problems as set forth above.

DISCLOSURE OF THE INVENTION

In one aspect of the present invention, a control system for a fluid operated jack has a piston rod extensibly movable between first and second spaced apart positions, a reservoir, and a source of pressurized fluid connected to and between said jack and said reservoir and being adapted to deliver pressurized fluid flow from said reservoir to said jack. The control system has a position sensor for sensing the position of the piston rod and delivering a jack position signal in response to said jack being at a preselected location between the first and second positions, a first control valve connected to and between said fluid source and jack and being shiftable between a first position at which pressurized fluid flow is deliverable from the source to the jack and a second position at which the pressurized fluid flow deliverable between the source and jack is blocked at the first control valve, and a second control valve connected to and between the jack and reservoir and shiftable between a first position at which fluid flow is deliverable from the jack to the reservoir and a second position at which fluid flow is blocked at the second control valve. The second control valve is adapted to pass the combined fluid flow of the jack and the source to the reservoir in response to the first and second control valves being at the first position. A restricting device limits the magnitude of fluid flow being delivered from the second control valve to the reservoir to a preselected maximum flow rate. An implement controller receives the jack position signal and shifts the first control valve from the second position to the first position in response to the jack being at the preselected location between the first and second positions and the second control valve being at the first position In another aspect of the present invention, a material handling vehicle having a frame and a lift mast assembly mounted on the frame is provided. The lift mast assembly has a pair of spaced apart uprights, a load engaging implement supported on the pair of uprights and elevationally movable along the uprights, and a single acting fluid operated jack mounted on the uprights and movable between extended and retracted positions. The load engaging implement is elevationally movable along the uprights between first and second elevationally spaced apart positions in response to movement of the single acting fluid operated jack between the extended and retracted positions. A pump is connected to and between the fluid operated jack and a reservoir and delivers pressurized fluid flow to the jack. A position sensor senses the elevational position of the load engaging implement between the first and second positions and delivers a load engaging implement position signal representative of the elevational location of the load engaging implement between said first and second positions. A control valve receives a first control signal and passing fluid flow from the pump to the single acting fluid operated jack in response to receiving the first control signal. The control valve receives a second control signal and delivers fluid flow from the single acting jack to said reservoir in response to receiving the second control signal. A restricting device limits the magnitude of fluid flow passed to the reservoir to a preselected flow rate, and a implement controller receives a lowering command signal and delivers the second signal in response to receiving the lowering command signal. The implement controller also receives the elevational position signal and delivers the first signal in response to the elevational position of the load engaging implement being located within a preselected range of movement between the first and second elevational positions. The restricting device reduces the speed of lowering of the lifting implement in response to the control valve passing the combined flow of fluid from the pump and the jack to the reservoir.

In yet another aspect of the present invention, an automatic guided material handling vehicle has a frame and a lift mast assembly mounted on the frame. The lift mast assembly has a pair of spaced apart uprights, a load engaging implement supported on the pair of uprights and elevationally movable along the uprights, and a single acting fluid operated jack mounted on the uprights and being movable between extended and retracted positions. The load engaging implement is elevationally movable along said uprights between first and second elevationally spaced apart positions in response to movement of the single acting fluid operated jack between the extended and retracted positions. A position sensor senses the elevational position of the load engaging implement between the first and second positions and delivers a load engaging implement position signal in response to said load engaging implement being at preselected location between the first and second positions. A pump connected to and between the fluid operated jack and a reservoir and delivers pressurized fluid flow to the jack. An electric motor is connected to the pump and actuatable to increase the speed of the pump in response to receiving a motor control signal. A control valve delivers fluid flow from the single acting jack to the reservoir in response to receiving a valve control signal A restricting device limits the magnitude of fluid flow passed by the control valve to the reservoir to a preselected flow rate. A vehicle controller issues a load engaging implement lowering signal, and a implement controller system receives the implement lowering signal and delivers the valve control signal in response to receiving the implement lowering signal The implement controller delivers the motor control signal to said motor and increases the speed of the pump in response to receiving said implement position signal. The restricting means reduces the speed of lowering of the load lifting implement in response to the control valve passing the combined flow of fluid from the pump and the jack to the reservoir.

By adding fluid flow of the pump to the restricted rate of fluid flow delivered to the reservoir the speed of retraction of the jack and the rate of lowering of the load engaging implement is reduced so that the above noted problems are alleviated.

Since the system does not require sophisticated modulatable control valves, valves which are capable of varying the flow of fluid, the cost of the system is substantially reduced. Because a low cost electrically actuated on-off type of valve is used, only a single signal is required to actuate the each of the valves. Therefore a low cost implement controller of simple design may be utilized to control the valves.

Because the restricting device limits the amount of flow passed to the reservoir to a preselected flow rate, by varying the speed of the pump drive motor, the speed of descent of the jack may be varied according to preselected speed curves. This is easily achieved by the implement device and associated preprogrammed instructions.

Also, the flexibility of the system design permits the user to make a program change without the need for any expensive hardware and component changes.

BEST MODE FOR CARRYING OUT THE INVENTION

Figure 1:
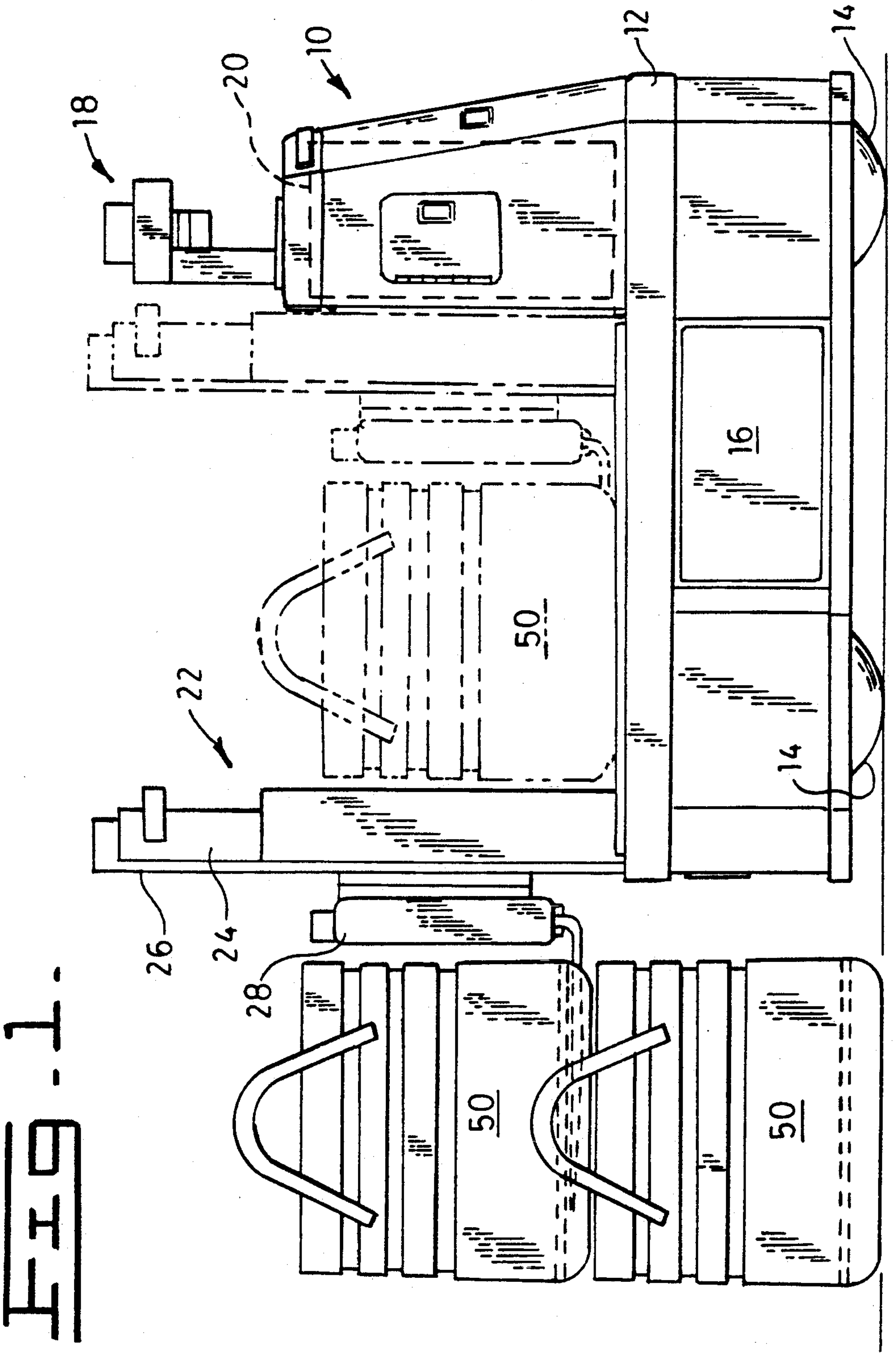
FIG. 1 is a diagrammatic side elevational view of an embodiment of the present invention showing an automatic guided vehicle with an elevationally movable lift mast assembly.

With reference to the drawings, and particularly FIG. 1, a material handling vehicle, for example an automated guided vehicle of the free ranging type is shown. The vehicle 10 has a frame 12 and a plurality of ground engaging wheels 14 rotatively mounted on the frame. At least one of the ground engaging wheels 14 is driven by an electric motor (not shown) powered by a source of power 16, for example a battery. A laser scanner 18 is mounted on the vehicle frame 12 and rotates about an elevational axis for siting a plurality of targets spaced throughout the area in which the vehicle 10 operates. The scanner 18 is connected to a vehicle controller 20 which controls navigation of the vehicle 10 based on preprogrammed instructions and feedback from the scanner 18 and other on-board sensors (not shown). The on-board sensors are utilized to provide information to the vehicle controller 20 which enables dead reckoning of the vehicle 10. The laser scanner 18 confirms, by siting various targets, the actual location of the vehicle 10. The vehicle controller 20 compares the sited location with the dead reckoning location and makes whatever corrections or adjustments are necessary to keep the vehicle 10 on the desired course of travel The calculations are made within a processor of the vehicle controller 20

Figure 2:
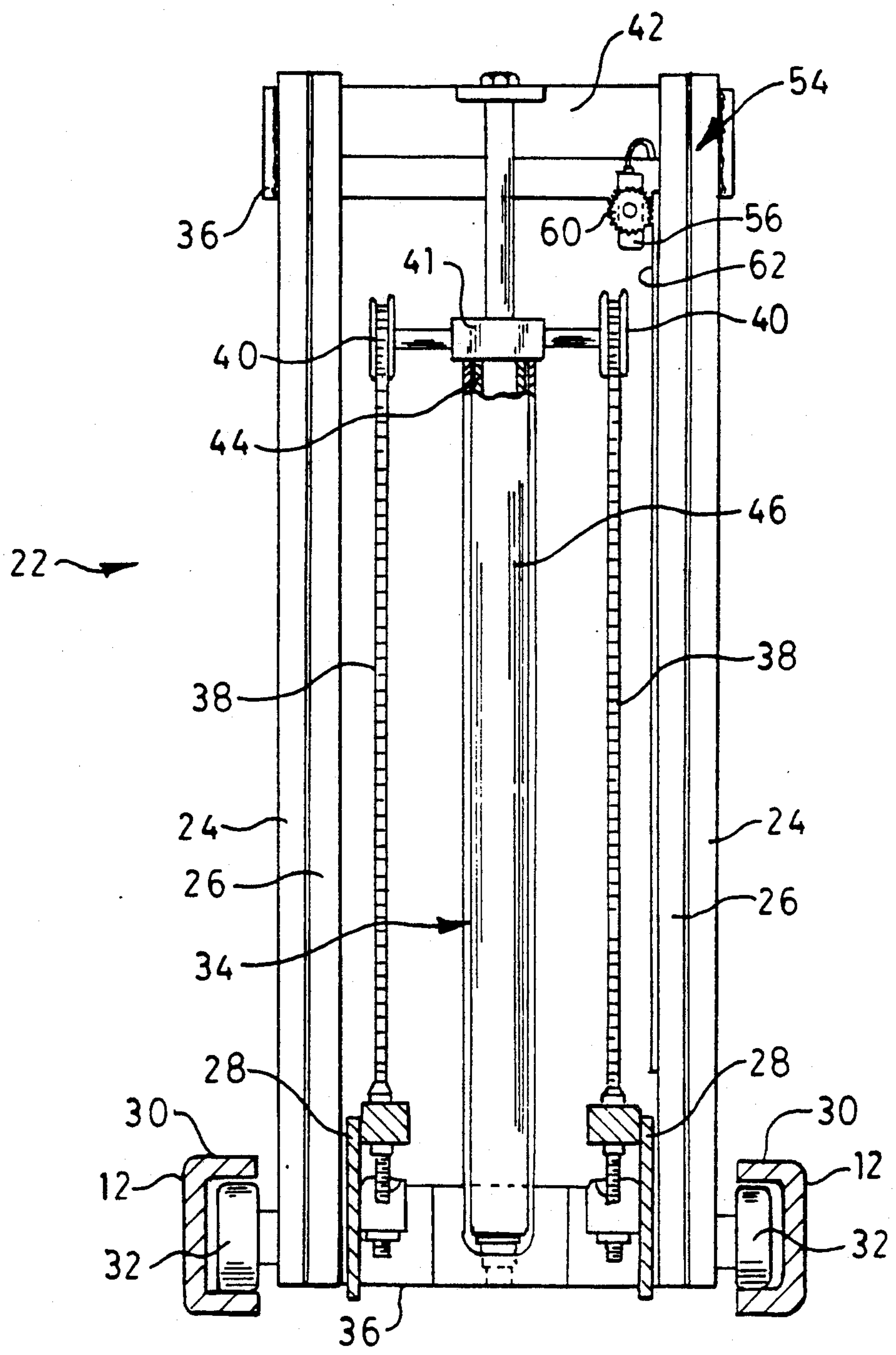
FIG. 2 is a diagrammatic partial front elevational view of the elevationally movable lift mast assembly.

A lift mast assembly 22 having first and second spaced apart uprights 24,26 and a load engaging implement 28 is mounted on the vehicle frame 12. The first pair of uprights 24 are supported on the frame 12 and moveable along the frame 12 between spaced apart locations on the frame 12 and longitudinally of the vehicle 10. One of the locations is shown in solid lines and the other location is shown in phantom lines. As best seen in FIG. 2, the first pair of uprights 24 are guided in guideways 30 of the frame for movement in longitudinal directions between the spaced apart locations by a plurality of rollers 32. The second pair of uprights 26 are disposed between the first pair of uprights 24 and guided by the first pair of uprights 24 for elevational movement in a conventional and well known manner. The load engaging implement 28 is supported on the second pair of uprights 26 and guided by the second pair of uprights 26 for movement between elevationally spaced apart locations in a conventional well known manner. A lift jack 34 is connected to a cross tie member 36 which is affixed to the first pair of uprights 24. The cross tie member 36 maintains the first pair of uprights 24 at a preselected spaced apart distance and parallel to each other.

A pair of lift chains 38 are trained over a pair of sheaves 40 and connected at opposite ends to the load engaging implement 21 and the second pair of uprights 26. The sheaves 40 are connected to the lift jack 34 by a cross head 41. The cross head 41 is engageable with a cross tie member 42 which is connected to the second pair of uprights 26 in response to extension of a piston rod 44 of the lift jack assembly. Specifically, the piston rod 44 is disposed in a cylinder housing 46 and slidably extensibly moveable relative thereto. The cross head 41 is preferably connected to one end of the piston rod 44 and engageable with the cross tie member 42 in response to extensible movement of the piston rod relative to the housing 46. Movement of the piston rod 44 causes elevational movement of the load engaging implement by virtue of the chains 38 and sheaves 40 as the piston rod extends and retracts relative to the cylinder housing 46. The head end of the cylinder housing 46 is connected to the cross tie member 36 at a lower end portion of the first pair of uprights 24. Extension and retraction of the piston rod 44 relative to the cylinder housing 46 is achieved in a conventional manner such as by directing pressurized fluid to the head end of the cylinder housing 46 and exhausting pressurized fluid therefrom. It is to be noted that the lift jack 34 is preferably a single acting jack in which pressurized fluid is present only at the head end of the jack 34. Retraction of the piston rod 44 is achieved under the force of gravity and no pressurized fluid is present at the piston rod end of the jack opposite the head end.

Referring to FIG. 1, the load engaging implement 28 preferably includes, but is not limited to a pair of spaced apart "L" shaped forks 48 which extend outwardly relative to the uprights 24,26. The forks 48 are disposable beneath a load 50 to be lifted. The load 50 is shown as a tub, however, other types of loads such as palletized loads, containers, bins, and the like would be considered an equivalent and capable of being lifted by the load engaging implement 28.

Figure 3:
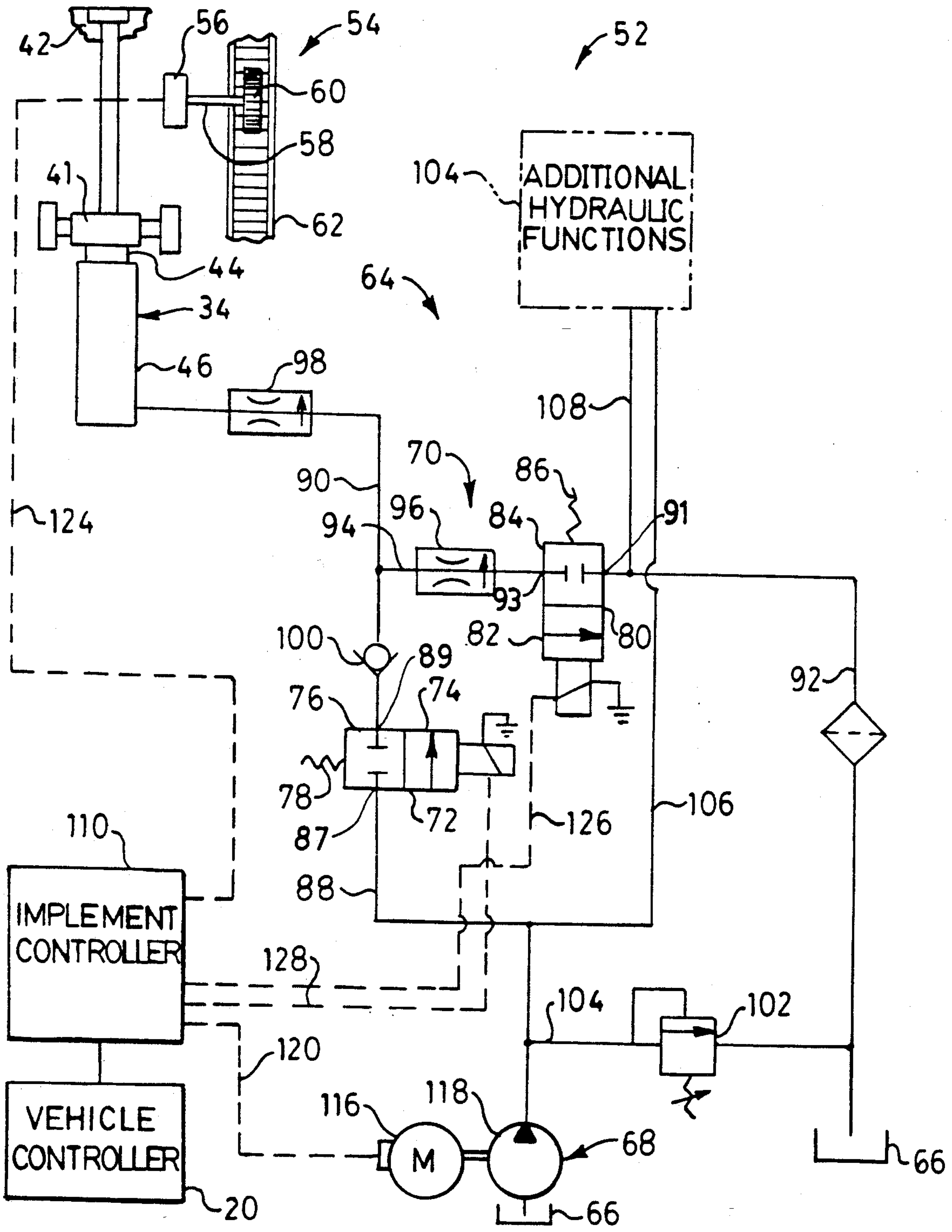
FIG. 3 is a diagrammatic schematic representation of the control system which controls extensible movement of a lift jack of the lift mast assembly.

Referring to FIG. 3, a control system 52 for the fluid operated jack 34 is disclosed. The piston rod 44 of the fluid operated jack is moveable between first and second spaced apart positions relative to the housing 46 for moving the load engaging implement 28 between spaced apart elevational positions which have a magnitude proportional to the amount of movement of the piston rod between first and second (retracted and extended) positions. The control system 52 includes a means 54 for sensing the position of the piston rod 44 and delivers a jack position signal in response to the jack 44 being a preselected location between the first and second positions. Due to the proportional relationship between the position of the load engaging implement 28, the second pair of uprights 26 and the location of the piston rod 44, the sensing of the position of any one of these three elements would provide information related to the others. Thus, when reference to the position of the piston rod 44 is made the position of these other components may be substituted. Specifically, the sensing means 54 includes a resolver 56 having a rotatable shaft 58 and a gear 60 mounted on the shaft 58. The gear 60 is engageable with a rack gear 62 and rotatable in response to linear motion between the gear 60 and the rack 62. As best seen in FIG. 2, the rack gear 62 is mounted on the second pair of uprights 26 and the resolver 56 is mounted on the first pair of uprights 24. As the second pair of uprights 26 move relative to the first pair of uprights 24, the shaft 58 will rotate and cause the resolver to deliver a signal correlative to the amount of extension of the piston rod 44. Alternately, the resolver 56 may be connected to one of the piston rod 44 and housing 46 and the rack member 62 may be connected to the other one of the housing and the piston rod 44. Resolvers of this type are well known in the art and will not be discussed in any greater detail.

The control system 52 includes a fluid operated system portion 64 which provides pressurized fluid to elevationally move the piston rod 44 and cause movement of the implement 28 and second pair of uprights 26. The fluid operated system 64 includes a reservoir 66 and a source of pressurized fluid flow 68 which is connected to and between the cylinder housing 46 of the jack 34 and the reservoir 66. The source of pressurized fluid flow 68 is adapted to pass pressurized fluid flow from the reservoir 66 to the jack 34 and cause extension of piston rod 44.

A control valve means 70 receives a first control signal and passes fluid flow from the fluid source 68 to the fluid operated jack 34 in response to receiving the first control signal. The control valve means 70 also receives a second control signal and passes fluid flow from the jack 34 to the reservoir 66 in response to receiving the second control signal. The control valve means 70 preferably includes a first control valve 72 which is connected to and between the fluid source 68 and the jack 34. The first control valve 72 is shiftable between a first position 74 at which pressurized fluid flow is deliverable from the fluid source 68 to the jack 34 and a second position 76 at which pressurized fluid flow deliverable from said fluid source 68 to said jack 34 is blocked at the first control valve 72. Preferably the first control valve 72 is a solenoid or electrohydraulically actuated two position valve which is biased by spring 78 to the second position 76.

The control valve means 70 also includes a second control valve 80 which is connected to and between the jack 34 and reservoir 66. The second control valve 80 is shiftable between a first position 82 at which fluid flow is deliverable from the jack 34 to the reservoir and a second position 84 at which fluid flow deliverable from the jack 34 to the reservoir 66 is blocked at the second control valve 80. The second control valve 80, like the first control valve, is either solenoid or electrohydraulic and biased by spring 86 to the second position 84 at which fluid flow from the jack 34 is blocked at the second control valve 80 from passing to the reservoir 66. By virtue of the relative fluid connections of the first and second control valves 72,80, the second control valve 80 is adapted to pass the combined fluid flow of the jack 34 and the fluid source 68 to the reservoir 66 in response to the first and second control valves 72,80 each being at the first fluid passing positions 74,82. The fluid source 68 is connected to the inlet 87 of the first control valve 72 by conduit 88 and the outlet 89 of the first control valve 72 is connected to the jack 34 by conduit 90. The outlet 91 of the second control valve 80 is connected to the reservoir 66 by conduit 92 and the inlet 93 of the second control valve 80 is connected to the jack 34 via conduit 90 and branch conduit 94. It is to be noted that the first and second control valves 72,80 are each in series with the jack 34 and in parallel with each other relative to the jack 34 and reservoir 66 so that the combined fluid flow of the jack 34 and fluid source 68 are passable to the reservoir 66 by the second control valve 80. Stated another way, fluid flow passed by the first control valve 72 is in communication with both the jack 34 and the second control valve 80. Thus, fluid flow passed from the source 68 to the jack 34 is also passable by the second control valve 80 to the reservoir 66.

A restricting means 96 which is preferably a pressure compensated flow control valve is provided for limiting the magnitude of fluid flow delivered from the second control valve 80 to the reservoir 66 to a preselected maximum flow rate. The restricting means 96 is preferably disposed in the conduit 94, however, it may be disposed in conduit 92 between the second control valve 80 and the reservoir 66. It should be noted that the restricting means 96 is connected in series between the jack 34 and the reservoir 66. A second restricting means 98 is disposed in conduit 90 between the jack and the first and second control valves 72,80. The second restricting means 98 limits the amount of fluid flow passed from the jack 34 to the reservoir 66 in the event of failure of lines 90 or 94 and controls the rate of lowering of the piston rod 44 and the load engaging implement 28 to a preselected maximum rate. The rate of fluid flow passable by the second restricting means 98 is at a greater volume than that passed by restricting means 96. Thus the restricting means 96 establishes the rate of fluid flow passed to the reservoir during normal operation.

A check valve 100 is connected in conduit 90 between the jack 34 and first control valve 72. The check valve 100 blocks fluid flow from passing from the jack 34 towards the fluid source 68 but allows fluid flow to pass from the jack 34 to the second control valve 80. A relief valve 102 is connected in conduit 104 between the fluid source 68 and the reservoir 66 and protects the fluid source 68 from overpressurization by passing fluid from the conduit 88 to the reservoir 66 when overpressurization occurs. Thus damage to the fluid source 68 caused by overpressurization is eliminated.

The fluid source 68 may also provide pressurized fluid flow for additional hydraulic functions 104, for example, steering and additional load handling attachments (not shown). The additional hydraulic functions 104 are connected to the pressure source 68 and the reservoir 66 by conduits 106 and 108, respectively, and supplied with pressurized fluid flow from the fluid source 68 on the as needed or continuous basis.

An implement controller means 110 is provided for controlling the valve means 70 and the fluid source 68 in response to receiving signals from at least one of a vehicle controller means 20 and the position sensing means 54.

The fluid source 68 preferably includes an electric motor 116 which is connected to a pump 118. The electric motor 116 receives signals from the implement control means 110 by a conductor 120. The motor 116 is preferably variable in speed and responsive to the control means 110 for changing the speed. The pump 118 rotates in response to rotation of the motor 116 at a speed proportional to the rate of rotation of the motor 116. The amount of pressurized fluid flow delivered by the pump is proportional to the speed of rotation of the motor 116 and varies in response to variations in the speed of rotation of the motor 116.

The sensing means 54 delivers the position signal, which is correlative to the amount of extension of the jack 44, the elevational position of the load engaging implement 28 and the amount of extension of the second pair of uprights 26 to the control means 110 via conductor 124. The control system 110 receives the signal from the position sensing means 54 and based on commands from the vehicle controller means 20 shifts the first control valve 72 from the second position 76 to the first position 74 in response to the signal delivered from the position sensing means 54 indicating that the jack is at a preselected location between the first and second positions and the second control valve 80 is at the first position 82. The vehicle controller means 20 includes a onboard microcomputer which processes the highest level of vehicle and load handling commands to be performed, for example, navigation, guidance, and implement actuation. The vehicle controller means 20, based on preprogrammed instructions, delivers commands to the control means 110 which causes the control means 110 to carry out lower level commands, such as delivering signals to the motor 116 and the first and second control valves 72,80. The vehicle controller means 20 delivers control signals such as implement raise and implement lower and the implement control means 110 carries out the command from the vehicle controller means 20 by controlling the motor 116 and the first and second control valves 72,80 as a function of the signals delivered from the position sensing means 54.

The implement control means 110 includes a microprocessor (not shown) which processes the various signals received and based on preprogrammed instructions controls operation of the fluid operated system 64. In response to receiving an implement raise signal from the vehicle controller means 20, the implement controller means 110 delivers à signal to the first valve 72 by conductor 128 and shifts the control valve 72 to the first position 74 at which the source 68 is in communication with the jack 34. At approximately the same time or slightly before the implement controller means 110 delivers a control signal to the motor 116 to change the speed thereof to a preselected magnitude established by the preprogrammed instructions loaded in the processor of the control means 110. Flow is then delivered from the pump 118 to the jack 34 which extends the piston rod 44 and raises the load engaging implement 28 to a desired preselected position as indicated by feedback from the position sensing means 54 to the implement controller means 110. It is to be noted that the speed of the motor 116 during raising of the load engaging implement 28 may be varied or held constant by simple changes in the program instructions which may be made in the field. Typically the speed of operation of the motor 116 is established according to desired performance curves, and as a function of the particular load handling task being performed.

To lower a load 50 carried on the load handling implement 28, the vehicle controller means 20 issues a implement lower command signal to the implement controller means 110. The implement controller means responds by delivering a second control signal to the second control valve 80 via conductor 126. The second control valve 80 shifts from the second position 84 to the first position 82 in response to receiving the second control signal and passes fluid flow from the jack 34 to the reservoir 66 at a preselected flow rate determined by the restricting means 96. The position sensing means 54 preferably continuously delivers position signals representative of the location of the lift jack 34 between the first and second positions. It is to be noted that the continuous delivery of position signals may not be required and may be replaced by an intermittent or a single delivered position signal. The control means 110 utilizes the signal delivered from the position sensing means 54 and delivers a control signal via conductor 128 to the first control valve 72 when the lift jack is at a preselected location between the first and second positions. The control valve 72, in response to receiving this signal, shifts to the first position 74 and connects the fluid source 68 to the jack 34. At substantially the same time the control means 110 delivers a signal to the motor 116 via conduit 120 to cause the pump 118 to deliver pressurized fluid flow to the jack 34. The additional volume of fluid from the fluid source is combined with the fluid exiting the jack 34. Thus, the speed of retraction of the piston rod 44 and movement of the implement 28 is reduced. The restricting means 96 limits the amount of fluid flow to a preselected rate and since all flow passing to the reservoir 66 must pass through the restricting means 96 the rate of retraction of the piston rod 44 is reduced.

Several options are available with this control system 52. The motor 116 may be a fixed speed motor or a variable speed motor and the control valve 72 may be eliminated if additional hydraulic functions 104 are not required. By utilizing a variable speed motor 116, it is possible to vary the speed of extension or retraction of the jack 34 throughout its length of stroke as compared to a fixed speed motor. The sizing of the pump 116, the motor 116, the restrictor valve means 96 and the jack 34 are based on the parameters such as load weight, speed of operation and demands of the material handling system. This control system 52 provides the flexibility necessary to permit adaptation to applications where different operational characteristics are demanded.

INDUSTRIAL APPLICABILITY

With reference to the drawings, the automatic guided vehicle 10 travels into position relative to a load 50 to be lifted under the guidance of the vehicle controller means 20 which is fed information from the laser scanner 18 and other sensors located on the vehicle. As the vehicle 10 approaches the load, the lift mast assembly 22 is moved longitudinally of the direction of movement of the vehicle 10 from a load carrying position as shown in phantom lines (FIG. 1) to a load lifting position as shown in solid lines. The vehicle controller means 20 at the appropriate time, as determined by the on-board vehicle sensors (not shown) and preprogrammed instructions, delivers the lifting command signal to the implement controller means 110 to elevate the load lifting implement 28 to a desired height. The control means 110 in response to receiving the lifting signal shifts the first control valve 72 to the first position 74 and actuates motor 116 so that pressurized fluid flow is passed by the control valve 74 to the jack 34. The position sensing means 54 senses the elevational position of the load engaging implement 28 and delivers the sensed position to the implement control means 110 by conductor 124. Upon achieving the proper elevational height, as determined by feedback from the position sensing means 54 and based on preprogrammed instructions of the implement control means 110, the implement control means 110 causes the first control valve 72 to shift under the bias of spring 78 to its second position 76 at which pressurized fluid flow to the jack 34 is blocked and movement of the jack 34 is stopped. The speed of the motor 116 may also be reduced or increased depending on the fluid needs of the other hydraulic functions 104. Should there be no other hydraulic demands placed upon the control system 54, the processor executing the preprogrammed instructions may include a routine to stop rotation of the motor 116 or reduce the speed of the motor in an effort to save energy.

The automatic guided vehicle 10 is then commanded by the vehicle controller means 20 to move toward the load 50 until the forks 48 of the load engaging implement 28 are disposed adequately beneath the load 50 to be lifted. It should be noted that alignment of the forks 48 relative to the load 50 was achieved during elevational movement of the load engaging implement 28 as previously mentioned. When the forks 48 are satisfactorily positioned beneath the load 50, the vehicle controller means 20 instructs the implement controller means 110 to further elevate the load engaging implement 28 a preselected distance in order to raise the load 50 from being supported on the load 50 located beneath and to enable the vehicle 10 to transport the load 50 carried on the forks 48 to a remote location. The load is carried on the vehicle 50 as shown in phantom lines in FIG. 1.

When the automatic guided vehicle 10 reaches the location at which the load 50 is to be deposited, the load 50 is lifted from being carried from on the vehicle 10, as shown in FIG. 1 in phantom lines, and in a manner of operation as previously described. The lift mast assembly 22 is then moved longitudinally of the vehicle 10 from the position as shown in phantom lines to the position as shown in solid lines wherein the load 50 may be lowered onto the floor, racks, load stands, or the like.

When the vehicle 10 is in the proper position for load lowering purposes, the vehicle controller means 20, based on execution of the preprogrammed instructions, delivers a signal to the implement controller means 110 commanding the implement controller means to lower the load 50. The implement controller means 110 responds to this command by executing the preprogrammed instructions for load lowering. As a result the implement controller means delivers a second signal via conductor 126 to the second control valve 80. The second control valve 80 responds to the second signal and shifts from the second position 84 to the first position 82 at which fluid flow is delivered from the jack 34 to reservoir 66 via conduits 90, 94, and 92. The restricting means 96 regulates the rate of lowering of the load engaging implement 28 to a preselected maximum speed. When the load engaging implement 28 reaches the preselected location of the jack 34 between the first and second positions, the implement controlling means 110 signals the first control valve 72 via conductor 128 to shift to the first position 74 and the motor 116 via conductor 120 to cause the pump 118 to deliver pressurized fluid flow at a predetermined flow rate to the jack 34. The control means 110 delivers the control signal to the first control valve 72 and to the motor 120 in response to execution of the preprogrammed instructions and feedback information received from the position sensing means 54. By adding pump flow to the flow of fluid being exhausted from the jack 34 through the restricting means 96, the rate of descent of the jack 34 is reduced so that abrupt bottoming out of the jack 34 and the load engaging implement 28 is prevented. It should be recognized that the rate of lowering of the jack 34 may be varied throughout its length of stroke by making appropriate changes to the software being executed in the processor of the control means 110. By gradually increasing the amount of fluid flow delivered from the fluid source 68 to the jack 34 during lowering and subsequent to receiving the position signal but before bottoming out occurs, the rate of retraction of the jack may be gradually slowed to a stop so that abrupt bottoming out of the piston rod 44 is prevented. Therefore, the speed of operation of the lift mast assembly 22 is maximized while abruptness of operation and damage caused by impact is minimized.

Other aspects, objects, and advantages of the present invention can be obtained from a study of the drawings, the disclosure, and the appended claims.

We claim:

1. A control system for a fluid operated jack having a piston rod extensibly movable between first and second spaced apart positions, a reservoir, and a source of pressurized fluid connected to and between said jack and and said reservoir and being adapted to deliver pressurized fluid flow from said reservoir to said jack; comprising:

sensing means for sensing the position of the piston rod and delivering a jack position signal in response to said jack being at a preselected location between said first and second positions;

a first control valve connected to and between said fluid source and jack and being shiftable between a first position at which pressurized fluid flow is deliverable from said source to said jack and a second position at which said pressurized fluid flow deliverable between said source and jack is blocked at the first control valve;

a second control valve connected to and between said jack and reservoir and being shiftable between a first position at which fluid flow is deliverable from said jack to said reservoir and a second position at which fluid flow is blocked at said second control valve, said second control valve being adapted to pass the combined fluid flow of said jack and said source to said reservoir in response to the first and second control valves being at said first position;

restricting means for limiting the magnitude of fluid flow being delivered from the second control valve to the reservoir to a preselected maximum flow rate;

implement controller means for receiving the jack position signal and shifting said first control valve from the second position to the first position in response to said jack being at said preselected location between the first and second positions and said second control valve being at the first position, said second control valve and restricting means passing the combined fluid flow delivered from the source and jack to said reservoir and thereby reducing the speed of extensible movement of said jack.

2. A control system, as set forth in claim 1, wherein said restricting means is connected in series between the jack and the reservoir and the first control valve is connected in series between the jack and the source and in parallel with the second control valve so that fluid flow passed by the first control valve is in communication with both the jack and the second control valve.

3. A control system, as set forth in claim 2, wherein the restricting means includes a pressure compensated flow control valve connected between the jack and second control valve and between the first and second control valves.

4. A control system, as set forth in claim 3, including a check valve connected to and between the jack and first control valve, said check valve maintaining fluid flow from passing from said jack toward said source and allowing fluid flow to pass from said jack to said second control valve.

5. A control system, as set forth in claim 1, wherein said first and second control valves are electrically actuatable control valves, said implement controller means being connected to said first and second electrically actuatable control valves and being adapted to deliver first and second control signals to the first and second electrically actuatable control valves, respectively, and shifting said first and second electrically actuatable control valves from said second position to said first position in response to receiving said first and second signals, respectively.

6. A control system, as set forth in claim 1, wherein said source of pressurized fluid includes a pump and an electric motor drivingly connected to said pump, said implement controller means being connected to said electric motor and adapted to increase the speed of the electric motor in response to said jack being at said preselected location between said first and second positions and said second control valve being at said first position.

7. A control system, as set forth in claim 5, wherein said implement controller means includes processing means for commanding delivery of the first control signal, subsequent to commanding delivery of said second control signal, and in response to said implement controller means receiving said jack position signal.

8. A control system, as set forth in claim 1, wherein said fluid source includes, an electric motor rotatively connected to a pump, and wherein said jack includes a housing and said piston rod being slidably extensibly movable relative to the housing, and wherein said position sensing means, includes:

a resolver connected to one of the piston rod and housing; and a rack member connected to the other one of the housing and the piston rod, said resolver being engageable with the rack, rotatable in response to movement of the piston rod, and adapted to deliver a signal representative of the amount of extension of the piston rod, said implement controller means receiving said signal from the resolver and delivering a motor control signal, to increase the speed of said motor, and a first control signal, to shift said first control valve to the first position, in response to said jack being at the preselected location between said first and second jack positions and said second control valve being at said first position.

9. A material handling vehicle having a frame and a lift mast assembly mounted on the frame, said lift mast assembly having a pair of spaced apart uprights, a load engaging implement supported on the pair of uprights and elevationally movable along the uprights, a single acting fluid operated jack mounted on the uprights and being movable between extended and retracted positions, said load engaging implement being elevationally movable along said uprights between first and second elevationally spaced apart positions in response to movement of said single acting fluid operated jack between said extended and retracted positions, a reservoir, and a pump connected to and between said fluid operated jack and said reservoir and delivering pressurized fluid flow to said jack, comprising:

means for sensing the elevational position of the load engaging implement between said first and second positions and delivering a load engaging implement position signal representative of the elevational location of the load engaging implement between said first and second positions;

control valve means for receiving a first control signal and passing fluid flow from said pump to said single acting fluid operated jack in response to receiving the first control signal, and for receiving a second control signal and delivering fluid flow from said single acting jack to said reservoir in response to receiving said second control signal;

restricting means for limiting the magnitude of fluid flow passed to said reservoir to a preselected flow rate; and implement controller means for receiving a lowering command signal and delivering said second signal in response to receiving said lowering command signal, and for receiving said elevational position signal and delivering said first signal in response to the elevational position of the load engaging implement being located within a preselected range of movement between said first and second elevational positions, said restricting means reducing the speed of lowering of the load engaging implement in response to the restricting and valve means passing the combined flow of fluid delivered from the pump and the jack to the reservoir.

10. A material handling vehicle, as set forth in claim 9, including a variable speed motor drivingly connected to said pump, said implement controller means increasing the speed of the motor and the amount of fluid delivered from said pump to the single acting jack in response to the load engaging implement being located within said preselected range of movement between the first and second positions.

11. A material handling vehicle, as set forth in claim 9, wherein said valve means includes;

a first electrically actuatable control valve connected to and between said pump and jack and shiftable between a first position at which fluid flow is passed by said first control valve from said pump to said jack and a second position at which said fluid flow is prevented from being passed by said first control valve to said jack; and a second electrically actuatable control valve connected to and between said jack and reservoir and being shiftable between a first position at which fluid flow is passed by said second control valve from said fluid jack to said reservoir and a second position at which fluid flow is blocked from being passed from said jack to said reservoir, said first and second control valves being shiftable from the second position to the first position in response to receiving said first and second control signals, respectively, said second control valve passing the combined fluid flow of the pump and the jack in response to the first and second control valves being at the first position.

12. A material handling vehicle, as set forth in claim 11, wherein said first and second control valves each have an inlet port and an outlet port, the outlet port of the first control valve being connected to the inlet port of the second control valve and to the jack.

13. A material handling vehicle, as set forth in claim 12, where in said restricting means includes a pressure compensated flow control valve disposed between the outlet port of the first control valve and the inlet port of the second control valve and between the inlet port of the second control valve and the jack.

14. A material handling vehicle, as set forth in claim 10, wherein said position sensing means includes a resolver and said implement controller means includes a microprocessor means for processing said load and position signals based on preprogrammed instructions.

15. An automatic guided material handling vehicle having a frame and a lift mast assembly mounted on the frame, said lift mast assembly having a pair of spaced apart uprights, a load engaging implement supported on the pair of uprights and elevationally movable along the uprights, a single acting fluid operated jack mounted on the uprights and being movable between extended and retracted positions, said load engaging implement being elevationally movable along said uprights between first and second elevationally spaced apart positions in response to movement of said single acting fluid operated jack between said extended and retracted positions, comprising:

position sensing means for sensing the elevational position of the load engaging implement between said first and second positions and delivering a load engaging implement position signal in response to said load engaging implement being at preselected location between said first and second positions;

a reservoir;

a pump connected to and between said fluid operated jack and said reservoir and delivering pressurized fluid flow to said jack;

an electric motor connected to said pump and actuatable to increase the speed of the pump in response to receiving a motor control signal;

control valve means for delivering fluid flow from said single acting jack to said reservoir in response to receiving a valve control signal;

restricting means for limiting the magnitude of fluid flow passed by said valve means to said reservoir to a preselected flow rate;

vehicle controller means for issuing a load engaging implement lowering signal; and implement controller means for receiving said implement lowering signal and delivering said valve control signal in response to receiving said implement lowering signal, and for delivering the motor control signal to said motor and increasing the speed of said pump in response to receiving said implement position signal, said restricting means reducing the speed of lowering of the load engaging implement in response to the valve and restricting means passing the combined flow of fluid delivered from the pump and the jack to the reservoir.

* * * * *